United States Patent [19]

Fodor

[11] 4,316,449
[45] Feb. 23, 1982

[54] SOLAR HEATER

[76] Inventor: Joseph E. Fodor, 712 Shore Dr., Boynton Beach, Fla. 33435

[21] Appl. No.: 204,457

[22] Filed: Nov. 6, 1980

[51] Int. Cl.³ .............................................. F24J 3/02
[52] U.S. Cl. ................................... 126/429; 126/445; 126/449
[58] Field of Search ............... 126/429, 449, 450, 432, 126/441, 444, 445, 446

[56] References Cited

U.S. PATENT DOCUMENTS

| | | | |
|---|---|---|---|
| 2,553,073 | 5/1951 | Barnett | 126/434 |
| 2,680,437 | 6/1954 | Miller | 126/432 |
| 2,680,565 | 6/1954 | Lof | 126/429 |
| 4,068,652 | 1/1978 | Worthington | 126/429 |
| 4,092,978 | 6/1978 | Levine | 126/449 |
| 4,108,155 | 8/1978 | Koizumi | 126/429 |
| 4,141,337 | 2/1979 | Bergen | 126/429 |
| 4,141,339 | 2/1979 | Weinstein | 126/449 |
| 4,144,871 | 3/1979 | Porter | 126/449 |
| 4,201,195 | 5/1980 | Sakhuja | 126/450 |
| 4,203,428 | 5/1980 | Fodor | 126/432 |
| 4,219,012 | 8/1980 | Bergen | 126/449 |
| 4,223,665 | 9/1980 | Lowe | 126/449 |
| 4,246,888 | 1/1981 | Jarzenbeck | 126/449 |
| 4,248,212 | 2/1981 | Stevens | 126/449 |
| 4,266,531 | 5/1981 | Behrendt et al. | 126/449 |

Primary Examiner—Daniel J. O'Connor
Attorney, Agent, or Firm—Oltman and Flynn

[57] ABSTRACT

The present solar heater has partially overlapped solar radiation-absorbing panels of high heat conductivity material inside a housing which has an air inlet and an air outlet in the bottom below different panels. An apertured longitudinal partition in the housing separates the air inlet and outlet. Apertured transverse partitions divide the interior of the housing into three compartments, each containing several overlapping panels which form air passages where they overlap. The panels at the front and back in each compartment are spaced from the front and back walls of the housing to permit air to flow between them.

9 Claims, 8 Drawing Figures

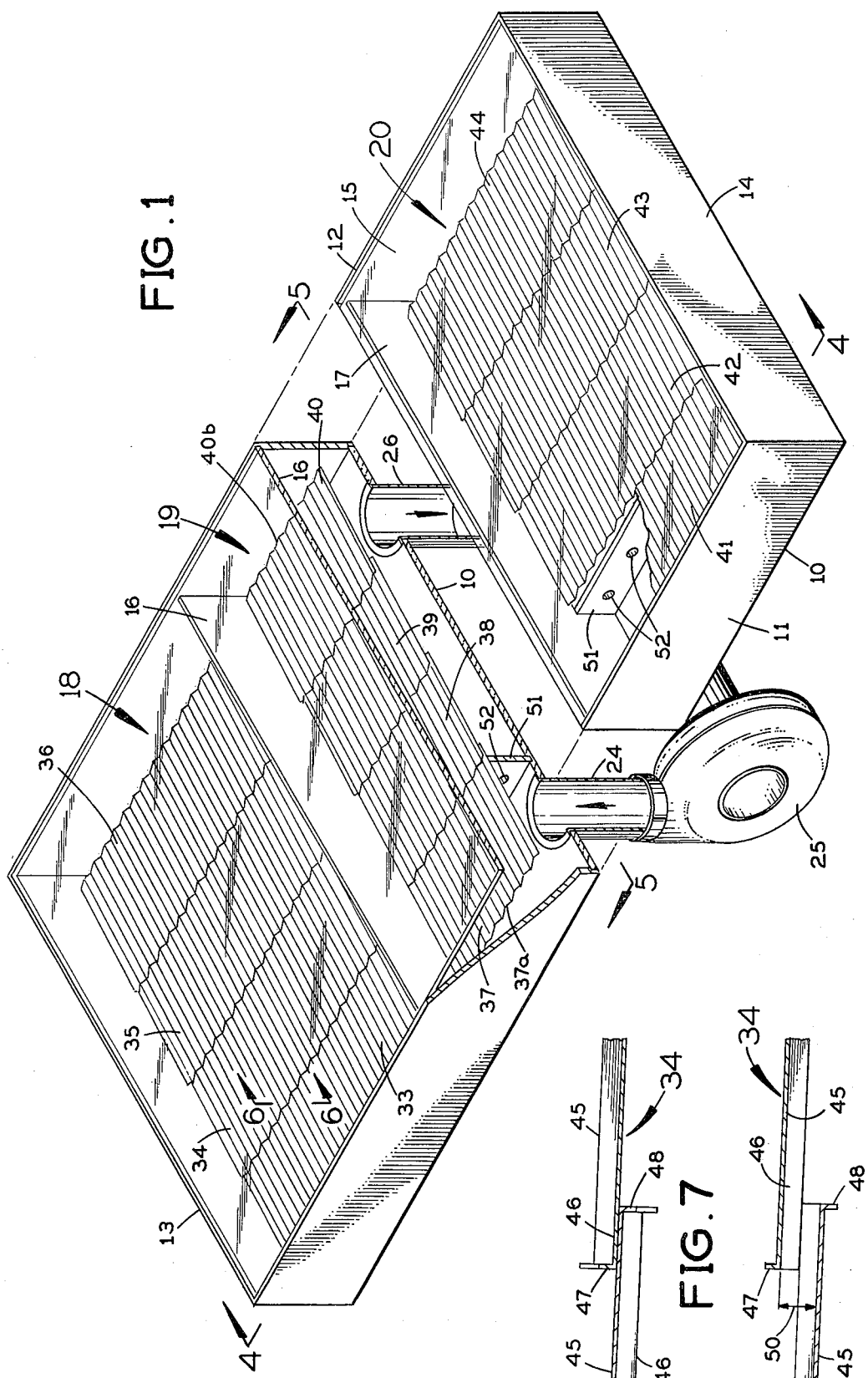
FIG. 1
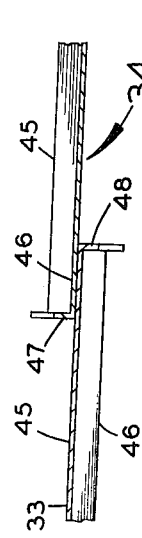
FIG. 7
FIG. 8

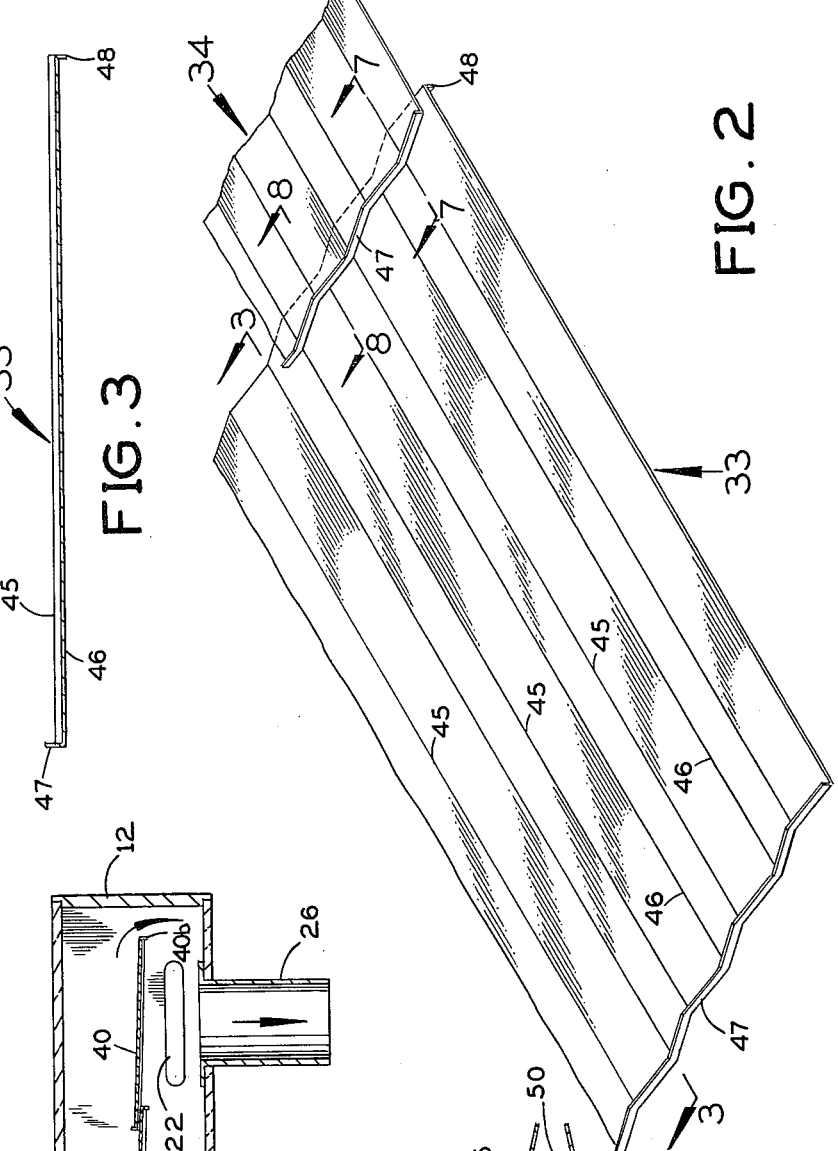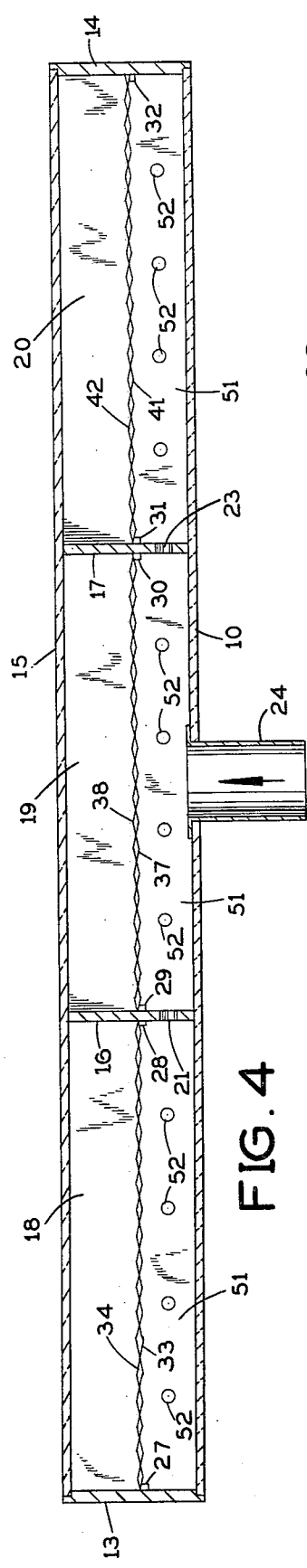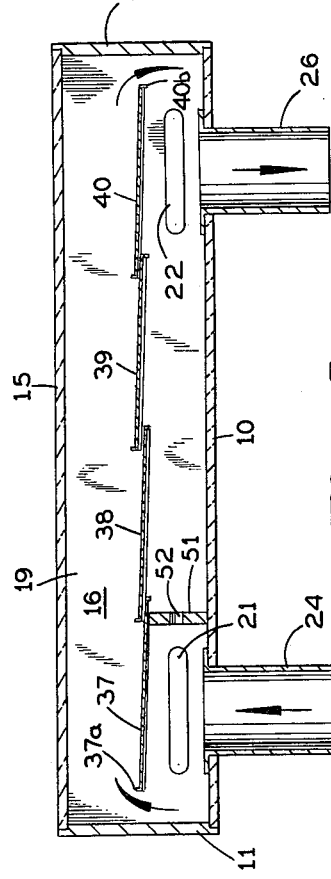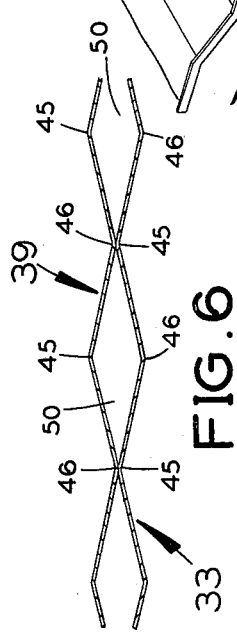

SOLAR HEATER

SUMMARY OF THE INVENTION

This invention relates to a solar heater having a plurality of partially overlapping solar radiation-absorbing panels of high heat conductivity material across which air is blown to withdraw heat from the panels.

Various solar heaters of this general type are disclosed in the following U.S. Pat. Nos.: Barnett 2,553,073, Miller 2,680,437, Lof 2,680,565, Levine 4,092,978 and Fodor 4,203,428.

The present invention is directed to such a solar heater having a novel arrangement of the radiation-absorbing panels and apertured partitions which substantially improves the heat transfer from the panels to air which is circulated through the heater, thereby enhancing the heat output of the solar heater.

A principal object of this invention is to provide a novel and improved solar heater which uses solar radiation to heat air that is circulated through the heater.

Another object of this invention is to provide a solar heater of this general type which is constructed to enhance the transfer of heat from partially overlapping solar radiation-absorbing panels in the heater to air flowing through the interior of the heater.

Another object of this invention is to provide such a heater which is relatively easy to assemble in such a way that the solar radiation-absorbing panels are positioned to have a highly efficient heat transfer to the air circulating past them.

Further objects and advantages of this invention will be apparent from the following detailed description of a presently-preferred embodiment, shown in the accompanying drawings.

In accordance with this presently-preferred embodiment, the present solar heater has a housing divided by apertured transverse partitions into three compartments, each holding several partially overlapped panels of high heat conductivity material which absorb solar radiation through a top cover on the housing. An air inlet and an air outlet at the bottom of the housing are separated by an apertured longitudinal partition which extends up from the bottom of the housing to the overlapped panels. The panels are corrugated and they are overlapped with the valleys of each overlying panel resting on the peaks of the underlying panel which it overlaps, so that passageways are formed between the panels where they overlap. Air flows from the air inlet to the air outlet of the heater across the top and bottom of all the panels and through the passageways where they overlap to provide a highly efficient transfer of heat from the panels to the air.

DESCRIPTION OF THE DRAWINGS

FIG. 1 is a perspective view of a solar heater in accordance with the present invention, with parts broken away for clarity;

FIG. 2 is a fragmentary perspective view showing two overlapping solar radiation-absorbing panels in the heater of FIG. 1;

FIG. 3 is a cross-section through one of these panels, taken along the line 3—3 in FIG. 2;

FIG. 4 is a longitudinal section through the solar heater, taken along the line 4—4 in FIG. 1;

FIG. 5 is a cross-section through the solar heater, taken along the line 5—5 in FIG. 1;

FIG. 6 is a vertical longitudinal section taken along the line 6—6 in FIG. 1 at the overlap between two of the solar radiation-absorbing panels in the heater;

FIG. 7 is a fragmentary section taken along the line 7—7 in FIG. 2 at the overlap between two panels where they engage each other; and FIG. 8 is a similar view taken along the line 8—8 in FIG. 2 where the overlapping panels have the maximum spacing from each other.

DETAILED DESCRIPTION

Referring to FIG. 1, the present solar heater has a box-like rectangular housing with a flat bottom wall 10, upstanding sides 11 and 12 at the front and back, and upstanding sides 13 and 14 at the opposite ends. A top cover 15 of glass or acrylic plastic which is transparent to solar radiation extends between the front, back and ends of the housing and is spaced above its bottom wall.

A pair of upstanding transverse partitions 16 and 17 extend between the bottom wall 10 and the top cover 15 from the front side 11 to the back side 12 at locations approximately equidistant from each other and the respective end walls 13 and 14, so as to divide the interior of the housing into three substantially equal sized compartments 18, 19 and 20 (FIG. 4). As shown in FIG. 5, the partition 16 is formed with a pair of horizontally elongated openings 21 and 22 for passing air between the compartments 19 and 18 on opposite sides of this partition. The other partition 17 is formed with a similar pair of openings 23 (only one of which is visible in FIG. 4) for passing air between the compartments 19 and 20 on opposite sides of this partition. These openings are located near the bottom of the respective partitions.

An air inlet pipe 24 is connected at its upper end in air-tight fashion to the bottom wall 10 of the housing close to its front side wall 11. The lower end of the air inlet pipe is connected to the outlet of an air blower 25 of known design. Near the back wall 12 of the housing an air outlet pipe 26 has its upper end connected in air-tight fashion to the bottom wall 10 of the housing. The blower 25 and the air outlet 26 may be connected in a system as disclosed in FIG. 6 of my U.S. Pat. No. 4,203,428.

As shown in FIG. 4, about half-way between the bottom wall 10 and the top cover 15, the end wall 13 of the housing carries an inwardly-projecting horizontal ledge 27. The transverse partition 16 carries a similarly located ledge 28 which projects horizontally toward the end wall ledge 27. On the opposite side, the partition 16 carries another horizontal ledge 29 at the same height as ledge 28. The other transverse partition 17 carries a similarly positioned horizontal ledge 30 which projects toward the ledge 29 on partition 16. On its opposite side, partition 17 carries a horizontal ledge 31 at the same height as ledge 30. The end wall 14 carries a similarly located ledge 32 projecting horizontally inward toward ledge 31, the two edges 31 and 32 being located at the opposite ends of chamber 20. These ledges 27–32 provide supports for solar radiation-absorbing panels in the present solar heater.

As shown in FIG. 1, there are four such panels 33, 34, 35 and 36 arranged in succession, partly overlapping one another, from front to back in the housing chamber 18. Similarly, four such panels 37, 38, 39 and 40 partially overlap one another in succession from front to back in chamber 19, and four panels 41, 42, 43 and 44 are arranged in the same manner in chamber 20. As shown in FIG. 5, the panels 37–40 in the central chamber 19 are inclined at a slight angle downward from front to back in the housing. This is also true of the panels 33–36 in chamber 18 and the panels 41–44 in chamber 20. The lower ends of these panels rest on the respective ledges 27–32 (FIG. 4) and their upper ends are spaced above the ledges. Each panel 33–44 preferably is of aluminum which is blackened to improve its ability to absorb solar radiation and convert it into heat energy.

As shown in FIG. 4, the front panel 37 in chamber 19 has its front edge 37a spaced substantially from the front side 11 of the housing. This is also true of panels 33 and 41 in chambers 18 and 20 respectively. The back panel 40 in chamber 19 has its rear edge 40b spaced substantially from the back side 12 of the housing. This is also true of panels 36 and 44 in chambers 18 and 20 respectively.

As best seen in FIG. 2, each solar radiation-absorbing panel is of corrugated configuration, presenting alternate, shallow, downwardly and upwardly facing "V"s, which have pointed peaks or apexes 45 and point valleys 46 midway between the peaks.

At its front edge the panel 33 (FIG. 2) is formed with an upwardly-projecting, short, vertical lip 47 and at its rear edge this panel is formed with a depending, short, vertical lip 48. The next panel 34 is of identical construction except that it is offset longitudinally of the first panel 33 by one-half the length of a complete corrugation, so that where the two panels overlap the valleys 46 of panel 34 rest directly on the peaks 45 of panel 33. This is shown in enlarged detail in FIG. 6, from which it will be evident that diamond-shaped passageways 50 are formed between the adjoining panels where they are in overlapping engagement with each other. The same is true of the overlap between panels 34 and 35, 35 and 36, 37 and 38, 38 and 39, 39 and 40, 41 and 42, 42 and 43, and 43 and 44.

Thus, in each compartment 18, 19 or 20, the four inclined panels are arranged in succession partially overlapping one another with the valleys on one panel engaging the peaks of the panel which it overlaps, as shown for the panels 34 and 33 in FIGS. 2 and 6.

As shown in FIGS. 1 and 5, a longitudinal vertical partition 51 extends up from the housing bottom wall 10 along the length of the housing between its opposite end walls 13 and 14. This partition is between the air inlet 24 and the air outlet 26 and it is directly below the overlapping ends of panels 33 and 34 in chamber 18, panels 37 and 38 in chamber 19, and panels 41 and 42 in chamber 20. Partition 51 is formed with a plurality of relatively small openings 52 which enable a restricted flow of air through this partition below the solar radiation-absorbing panels at each of the chambers 18, 19 and 20.

In the operation of this solar heater, the high heat conductivity corrugated panels 33–44 are heated by the sun. Inlet air is forced by the blower 25 through the air inlet 24 into the chamber 19 below panel 37 at the air inlet side of the longitudinal partition 51.

Some of this air passes through the openings 52 in the longitudinal partition at chamber 19 and flows across the bottom of panels 38, 39 and 40 to the air outlet 26.

Some of the incoming air flows up past the front edge of panel 37 into chamber 19 above this panel, where it can flow across the top of panels 37, 38, 39 and 40 in succession and down past the back edge of panel 40 to the air outlet 26. Some of this air also flows through the diamond-shaped openings 50 between the overlapped ends of panels 37 and 38, 38 and 39, and 39 and 40, and beneath the overlying panels to the air outlet 26.

Some of the incoming air at the air inlet 24 flows through the wide opening 21 in transverse partition 16 (FIG. 4) into chamber 18 below panel 33. From here, some of the air flows up around the front edge of panel 33 and across the top of panels 33, 34, 35 and 36, and down past the back edge of panel 36 and through the wide opening 22 in partition 21 (FIG. 5) to the air outlet 26. Some of this air also flows through the diamond-shaped openings 50 between the overlapped ends of panels 33 and 34, 34 and 35, and 35 and 36 into the space in chamber 18 below these panels before passing through the partition opening 22 to the air outlet 26. The remainder of the air entering chamber 18 below panel 33 flows through the openings 52 in longitudinal partition 51 and passes beneath panels 34, 35 and 36 before going through the opening 22 in transverse partition 16 on its way to the air outlet 26.

At the opposite side of the air inlet 24, the incoming air flows through the wide air inlet opening 23 in transverse partition 17 into chamber 20 below panel 41. From here some of the air flows through openings 52 in the longitudinal partition 51 and beneath panels 42, 43 and 44 before passing through the wide air outlet opening 23 in partition 17 to the air outlet 26. The rest of the air passing into chamber 20 below panel 41 flows up past the front edge of this panel into the space above it. From here, some of the air flows across the top of panels 41, 42, 43 and 44 and down past the back edge of panel 44 and through the air outlet opening 23 in transverse partition 17 to the air outlet 26. The remainder of this air flows through the diamond-shaped openings 50 between the overlapped ends of panels 41 and 42, 42 and 43, and 43 and 44, into the space below these panels and from there through the outlet opening in partition 17 to the air outlet 26.

The novel arrangement of the overlapped panels in each compartment of the housing, both in relation to each other and in relation to the apertured partitions 16, 17 and 51, directs the air through the interior of the housing in a variety of flow paths which maximize the transfer of heat from the solar radiation-absorbing panels 33–34 to the air.

I claim:
1. In a solar heater having:
   a housing having a bottom and upstanding sides and a top cover which passes solar radiation into the interior of the housing;
   and a plurality of inclined solar radiation-absorbing panels of high heat conductivity material in said housing spaced below said top cover, said panels partially overlapping each other in succession between opposite sides of the housing and defining air passages between them where they overlap;
the improvement which comprises:
   means defining an air inlet leading into the interior of said housing directly below the panel closest to one of said opposite sides of the housing;
   means defining an air outlet leading from the interior of said housing at a location spaced from said air inlet;
   an upstanding partition inside said housing below said panels between said air inlet and said air outlet, said partition having openings therein for passing a limited flow of air from said air inlet to said air outlet across the the bottom of the panels on the same side of said partition as the air outlet;
   said panel above the air inlet being spaced from the adjacent side of the housing to pass air from said air inlet up into the space between said top cover and said panels to flow across the top of said panels; the panel closest to the opposite side of the housing spaced from said last-mentioned side to pass air from said space down to said air outlet; and said air passages between neighboring overlapping panels on the same side of said partition as the air outlet passing air from said space down between the overlapping panels and across the bottom of the panels on said same side of said partition to said air outlet.

2. A solar heater according to claim 1, wherein said air outlet is directly below said panel closest to said opposite side of the housing.

3. A solar heater according to claim 1 wherein said panels are of corrugated shape and overlap each other in succession with the valleys of one panel resting on the peaks of the preceding panel.

4. A solar heater according to claim 1, and further comprising:
a pair of upstanding internal transverse partitions inside said housing on opposite sides of said air inlet and said air outlet, said pair of partitions extending transverse to said first-mentioned partition and extending up from the bottom of the housing to said top cover to divide the interior of the housing into three compartments, including a middle compartment at which said air inlet and outlet are located and end compartments on the opposite sides of said transverse partitions from said middle compartment;
and wherein:
said solar radiation-absorbing panels comprise a plurality of partially overlapping panels in each of said end compartments including opposite end panels spaced from adjacent sides of the housing to permit the flow of air between said end panels and said sides;
and said transverse partitions have openings therein on opposite sides of said first-mentioned partition for respectively passing air from said air inlet into the respective end compartments and for passing air from the respective end compartments to said air outlet.

5. A solar heater according to claim 4, wherein said air outlet is directly below said panel in the middle compartment closest to said opposite side of the housing.

6. A solar heater according to claim 5, wherein said panels in said end compartments are of corrugated shape and overlap each other in succession with the valleys of one panel resting on the peaks of the preceding panel.

7. A solar heater according to claim 4, wherein said panels in said end compartments are of corrugated shape and overlap each other in succession with the valleys of one panel resting on the peaks of the preceding panel.

8. In a solar heater having:
a generally rectangular housing having a bottom wall, upstanding opposite end walls, upstanding front and back walls, and a top cover which passes solar radiation into the interior of the housing;
and a plurality of inclined solar radiation-absorbing panels of high heat conductivity material in said housing spaced below said top cover, said panels partially overlapping each other in succession from front to back in the housing and defining air passages between them where they overlap;
the improvement which comprises:
a longitudinal partition extending from said bottom wall part way up to said top cover, said longitudinal partition extending inside the housing from one of said end walls to the opposite end wall and being located closer to said front wall than to said back wall of the housing;
a pair of transverse partitions extending from said bottom wall up to said top cover and from said front wall to said back wall, said transverse partitions intersecting said longitudinal partition at spaced locations along its length and dividing the interior of the housing into a middle compartment and opposite end compartments, each of said transverse partitions having openings therein on opposite sides of said longitudinal partition for respectively passing air to and from said middle compartment;
said longitudinal partiton having openings therein at each of said compartments;
said panels including a plurality of partially overlapping panels in each of said compartments and including a front panel in each compartment spaced from said front wall of the housing and a rear panel in each compartment spaced from said back wall of the housing;
means defining an air inlet in the bottom wall of the housing directly below the front panel in the middle compartment;
and means defining an air outlet in the bottom wall of the housing directly below the rear panel in the middle compartment.

9. A solar heater according to claim 8, wherein said panels are of corrugated shape and overlap each other in succession with the valleys of one panel resting on the peaks of the preceding panel from front to back in the housing.

* * * * *